(12) United States Patent
Weidinger et al.

(10) Patent No.: US 6,672,444 B2
(45) Date of Patent: Jan. 6, 2004

(54) PRESSURE PLATE ASSEMBLY

(75) Inventors: Reinhold Weidinger, Kolitzheim (DE); Erwin Ziegler, Wasserlosen (DE); Frank Hirschmann, Niederwerrn (DE)

(73) Assignee: Mannesmann Sachs AG, Schweinfurt (DE)

(*) Notice: Subject to any disclaimer, the term of this patent is extended or adjusted under 35 U.S.C. 154(b) by 16 days.

(21) Appl. No.: 09/968,751

(22) Filed: Oct. 2, 2001

(65) Prior Publication Data
US 2002/0040836 A1 Apr. 11, 2002

(30) Foreign Application Priority Data
Oct. 7, 2000 (DE) .......................... 100 49 651

(51) Int. Cl.$^7$ .............................................. F16D 13/75
(52) U.S. Cl. ............................... 192/109 R; 192/111 A; 192/70.25
(58) Field of Search ..................... 192/111 A, 109 R, 192/70.25

(56) References Cited

U.S. PATENT DOCUMENTS

| | | | | |
|---|---|---|---|---|
| 5,899,308 A | * | 5/1999 | Schulz-Andres | 192/70.14 |
| 5,941,356 A | * | 8/1999 | Weiss et al. | 192/70.25 |
| 5,984,067 A | * | 11/1999 | Weidinger et al. | 192/70.25 |
| 6,123,180 A | * | 9/2000 | Weidinger | 192/70.25 |
| 6,202,817 B1 | * | 3/2001 | Link et al. | 192/70.25 |
| 6,371,269 B1 | * | 4/2002 | Weidinger | 192/70.25 |
| 2002/0079186 A1 | * | 6/2002 | Weidinger | 192/70.25 |

* cited by examiner

Primary Examiner—Charles A Marmor
Assistant Examiner—Eric M. Williams
(74) Attorney, Agent, or Firm—Cohen, Pontani, Lieberman & Pavane

(57) ABSTRACT

A pressure plate assembly for a friction clutch includes a housing for mounting to a centrifugal mass; a pressure plate, which is mounted in the housing with freedom to move in the same direction as that in which a rotational axis (A) extends; a stored-energy element; and a wear-compensating device, acting in the path of force transmission between the stored-energy element and the pressure plate, where the wear-compensating device has at least one adjusting element able to move in an adjusting direction to compensate for wear. A clearance-producing arrangement includes a gripping element provided on the pressure plate, which, when wear occurs, comes to rest or can be brought to rest against a blocking element, which is fixed or can be fixed in place relative to the housing arrangement. During or after the connection of the housing arrangement to the centrifugal mass arrangement, the blocking element arrives in or can be brought into a state in which it can enter into a blocking interaction with the associated gripping element.

8 Claims, 2 Drawing Sheets

PRESSURE PLATE ASSEMBLY

BACKGROUND OF THE INVENTION

1. Field of the Invention

The present invention pertains to a pressure plate assembly for a friction clutch, comprising a housing arrangement designed to be connected to a centrifugal mass arrangement; a pressure plate held in the housing arrangement with freedom to move axially; a stored-energy element; a wear-compensating device acting in the path of force transmission between the stored-energy element and the pressure plate, where the wear-compensating device has at least one adjusting element able to move in an adjusting direction to compensate for the wear; and at least one clearance-producing arrangement, comprising a gripping element on the pressure plate, which element, when wear occurs, comes to rest or can be brought to rest against a blocking element, which is fixed or can be fixed in place relative to the housing arrangement.

2. Description of the Related Art

A pressure plate assembly of this type is known from, for example, U.S. Pat. No. 6,123,180. In this known pressure plate assembly, the blocking element provided to cooperate with the gripping element of the clearance-producing arrangement is screwed to the housing arrangement by threaded bolts and thus connected tightly to it. For this purpose, the housing arrangement has a specially shaped area, the surface of which is positioned facing the centrifugal mass arrangement and against which an appropriate surface of the blocking element comes to rest when the tightly-screwed connection mentioned above is made. Because of this design, it is necessary to fasten the blocking element tightly to the housing arrangement before the pressure plate and the components cooperating with it or assigned to it are integrated into the pressure plate assembly. This results in the problem that, after the assembly comprising the housing arrangement and the blocking element has been put together with the assembly comprising the pressure plate, the wear-compensating device, and the clearance-producing device, there is the potential danger that the blocking element can interact with the gripping element of the clearance-giving arrangement, this danger being caused by the pretensioning force existing between the housing arrangement and the pressure plate and by the absence of any support for the pressure plate at this stage of assembly, i.e., before the pressure plate assembly has been connected to the centrifugal mass arrangement. The result of such interaction would be the unwanted completion of a wear-compensating adjustment, even though no wear had yet occurred. The pressure plate assembly would then ultimately reach a state in which it could no longer be integrated into a friction clutch by assembly with a flywheel arrangement. It is therefore a familiar and necessary technique in the case of pressure plate assemblies of this type to provide some type of transport-securing devices to ensure that the pressure plate is held in a state in which it is shifted toward the housing arrangement, while at the same time the stored-energy element is brought into a pretensioned state to prevent the undesirable interaction mentioned above between the gripping element and the blocking element. The provision of such transport-securing devices, however, which must hold the stored-energy element in a highly pretensioned position, is a complicated process, especially because of the fact that the transport-securing devices must be massive enough and attached with sufficient permanence that the stored-energy element, which usually generates a comparatively large amount of force, is held securely in the tensioned state indicated above.

SUMMARY OF THE INVENTION

It is the object of the present invention to provide measures for a pressure plate assembly which use simple means to prevent an unwanted wear-compensating adjustment of the wear-compensating device before the pressure plate assembly is put together with a centrifugal mass arrangement.

According to the present invention, during or after the connection of the housing arrangement to the centrifugal mass arrangement, the blocking element arrives in or can be brought into a state in which it is able to enter into a blocking interaction with the associated gripping element.

As a result of the design of a pressure plate assembly according to the invention, in which, in the state before the assembly is connected to a centrifugal mass arrangement, the blocking element is ultimately unable to interact with the gripping element, there is basically no danger that unwanted movement of the pressure plate during transport will cause an undesirable wear-compensating adjustment of the wear-compensating device. Because it is impossible for the blocking element to interact with the gripping element, there is basically no need to provide additional transport-securing measures to make sure that the pressure plate is held in a pulled-back position relative to the housing arrangement. The pressure plate could ultimately be held in the desired position relative to the housing arrangement simply by the elements which connect the pressure plate to the housing arrangement such as tangential leaf springs, provided that they are strong enough. But if additional transport-securing devices are to be provided anyway to reduce the load on the tangential leaf springs, for example, these springs would then not have to be strong enough to pull the pressure plate all the way back and hold it there. Instead, a small movement toward the housing arrangement is enough to provide the tangential leaf springs with the load relief mentioned above; and, because of the small extent of this movement or stroke, the force exerted by the stored-energy element in the area of the transport-securing devices is also much smaller.

In a design variant of the pressure plate assembly according to the invention which is especially preferred because of the ease with which it can be manufactured and because of the small number of parts, it can be provided that the blocking element is held in position with respect to the housing arrangement by a fastening bolt element, which fastens the housing arrangement tightly to the centrifugal mass arrangement. It can be provided, for example, that, while the housing arrangement is being tightly fastened to the centrifugal mass arrangement by means of the fastening bolt element, the blocking element is fixed in place with respect to the housing arrangement in a state in which it can enter into a blocking interaction.

In the pressure plate assembly according to the invention, it is also preferable for the blocking element to pass through an opening provided in the housing arrangement, which opening allows relative motion between the housing arrangement and the blocking element; for the area of the blocking element situated inside the housing arrangement to enter into a blocking interaction with the associated gripping element; and for the area of the blocking element outside the housing arrangement to be fixed in place relative to the housing arrangement. Because the blocking element projects outward beyond the housing arrangement, it becomes easier to exert an effect on the blocking element, i.e., either to produce the blocking interaction or to bring the blocking element into a position which allows the blocking interaction to take place.

In this case it is then preferable to provide the area of the blocking element outside the housing arrangement with a pass-through opening for the fastening bolt element.

To make sure that the blocking element cannot come loose from the rest of the pressure plate assembly even in the transport state, that is, before the pressure plate assembly has been attached to a centrifugal mass arrangement, it is proposed that the area of the blocking element inside the housing arrangement be provided with a shape which does not allow this area of the blocking element to pass all the way through the opening provided in the housing arrangement.

So that the interaction between the blocking element and the gripping element already explained above can be reliably excluded in the transport state, it is proposed that, in a situation where the blocking element is not fixed in position relative to the housing arrangement, the area of the blocking element inside the housing arrangement is essentially free to move in the axial direction.

The present invention also pertains to a friction clutch in which a pressure plate assembly according to the invention is provided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
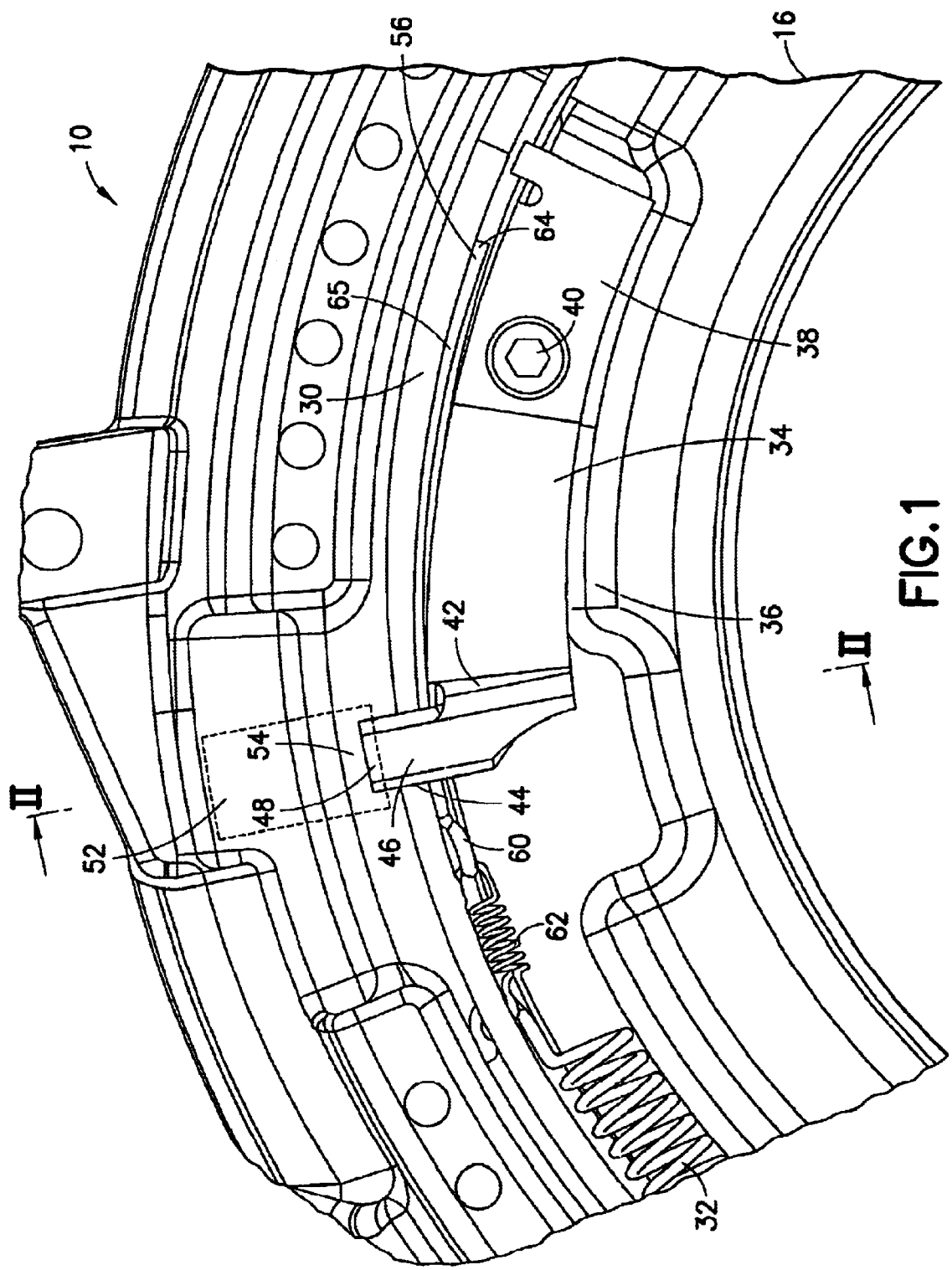
FIG. 1 is a partial axial view of a pressure plate assembly according to the invention.
Figure 2:
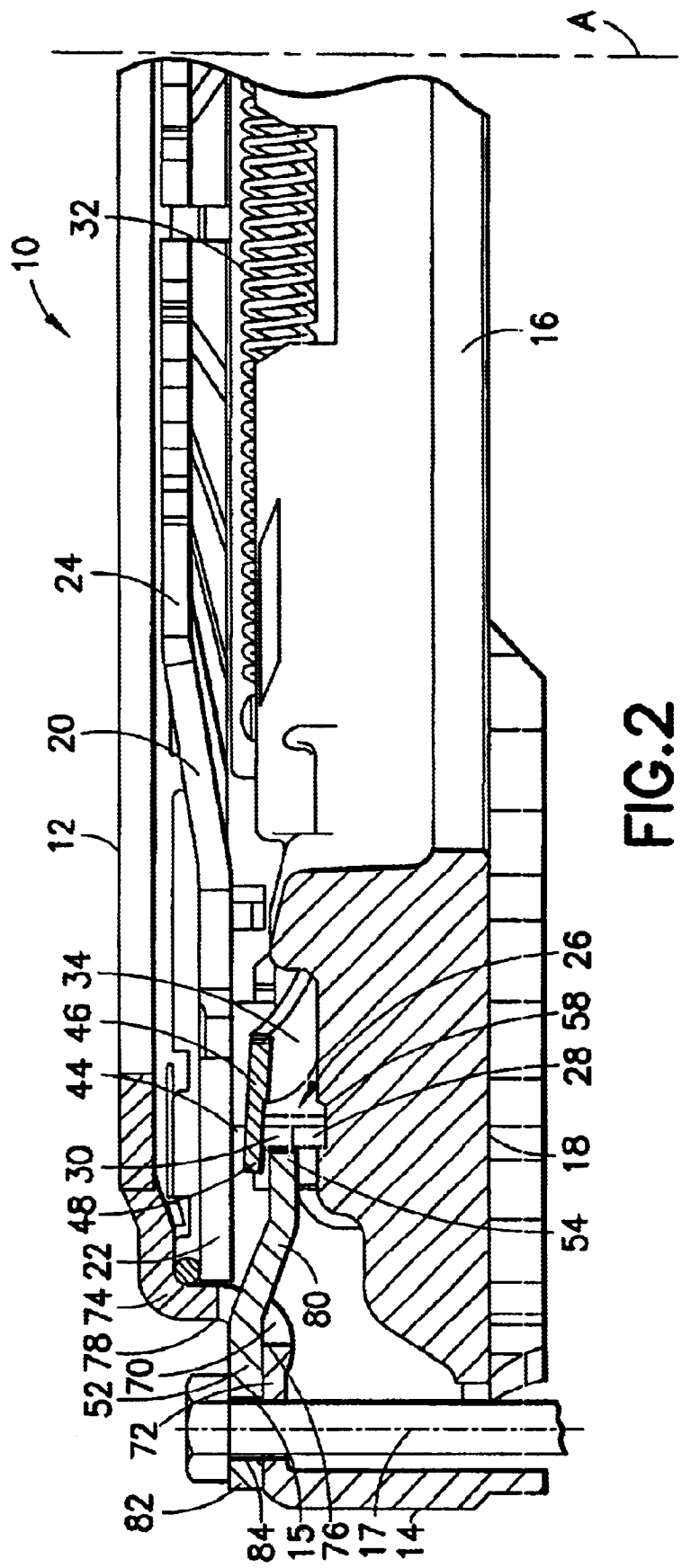
FIG. 2 is a partial longitudinal section through the pressure plate assembly according to the invention.

The pressure plate assembly 10 shown in FIGS. 1 and 2 comprises a housing 12, which is designed to be connected to a centrifugal mass arrangement (not shown in the figures) such as a single-mass flywheel or possibly a multiple-mass flywheel. The radially outer edge area 14 of the housing arrangement 12 points toward the centrifugal mass arrangement, and the free axial end of this area can have end stops, for example, which determine the relative axial positioning between the housing arrangement 12 and the centrifugal mass arrangement. The housing arrangement 12 and thus the entire pressure plate assembly 10 is fixed in position relative to the centrifugal mass arrangement by a plurality of threaded bolts 17, which pass through openings 15, which are distributed around the housing arrangement 12 in the circumferential direction, which bolts can be screwed into assigned openings in the centrifugal mass arrangement. To arrive at the required relative axial positioning here between the pressure plate assembly and the centrifugal mass arrangement, it would also be possible to provide spacer elements, for example, surrounding the threaded bolts 17 in the housing arrangement 12, which spacers can either be designed as separate components or formed as integral parts of the housing arrangement 12. A pressure plate 16 is provided inside the housing 12; the friction surface 18 of this plate can be pressed against a clutch disk, also omitted from the figures, the clutch disk thus being pressed in turn against a corresponding friction surface of the centrifugal mass arrangement. The pressure plate 16 is connected to the housing 12 by elements such as tangential leaf springs (not shown) or the like, so that it can move in the same direction as that in which the rotational axis A extends but is essentially prevented from rotating around the rotational axis A relative to the housing 12.

A stored-energy element 20 is also installed in the housing 12. The radially outer area 22 of this element is supported on the housing 12. The radially inner area is designed to exert force by so-called "spring tongues" 24 against a release mechanism of the pull type. The radially intermediate area exerts force on the pressure plate 16 by way of a wear-compensating device 26, which will be described further below. It should be pointed out that a stored-energy element 20 and a pressure plate assembly 10 of the pull type are presented only as examples; it is obvious that the stored-energy element 20 could also be supported on the housing 12 at a point radially inside the area in which it acts via the wear-compensating device 26 on the pressure plate 16 and thus provide a pushing type of action on the release mechanism. In the illustrated design example, the wear-compensating device 26 comprises two adjusting rings 28, 30. Adjusting ring 28 is supported on the pressure plate 16, and the adjusting ring 30 accepts the force exerted by the stored-energy element, i.e., by the diaphragm spring 20. The surfaces of the two adjusting rings 28, 30 which face each other are provided with complementary slanted or wedge-like areas, which create a wedge-like profile extending in the circumferential direction. Relative rotation of the two adjusting rings 28, 30 with respect to each other has the result that the total axial dimension of the wear-compensating device 26 is changed. The two adjusting rings 28, 30 are pretensioned for rotation with respect to each other by a helical tension spring installed radially inside the adjusting rings 28, 30. One end of the spring 32 acts on the adjusting ring 28, whereas the other end acts on, for example, the pressure plate 16.

The gripping element 34 of a clearance-producing arrangement 36 is also provided on the pressure plate 16, radially inside the adjusting rings 28, 30. One of the circumferential end areas 38 of the gripping element 34 is fixed by means of a threaded bolt 40 to the pressure plate 16, while the other circumferential end area 42 of the gripping element 34 has a gripping section 46, which extends radially outward through a circumferential and axial slot 44 in the adjusting ring 30. The gripping element 34 is made of elastic material such as spring plate and is pretensioned in its installed state in such a way that it exerts axial force on the adjusting ring 30 and thus on the entire wear-compensating device 26. As a result of this pretensioning effect, the two adjusting rings 28, 30 are clamped between the gripping section 46 and the pressure plate 16, so that even the pretensioning effect of the spring 32 is unable to cause the adjusting rings 28, 30 to move relative to each other in a rotational direction such that the total axial dimension of the wear-compensating device 26 is increased.

The free end 48 of the gripping section 46 of the gripping element 34 projects over a blocking element 52, which, as will be described below, is attached to the housing 12 and extends radially inward up as far as the adjusting rings 28, 30. There is therefore a radial overlap, as can be seen especially clearly in FIG. 1, between the end area 48 and a corresponding end area 54 of the blocking element 52.

The gripping element 34 of the clearance-producing arrangement 36 is also provided with an arresting element 56. This arresting element 56 extends radially inside the adjusting rings 28, 30, i.e., rests against their inside circumferential surfaces, and is guided in a corresponding recess 58 in the pressure plate 16, in which recess the adjusting ring 28 resting on this pressure plate 16 is also guided. A second helical tension spring 62 acts on the circumferential end area 60 of the arresting element 56, while the other end of this spring is fastened or hooked to the helical tension spring 32, namely to the end of this spring which cooperates with the adjusting ring 28, which can rotate in the circumferential direction around the rotational axis A, as will be described further below. The adjusting ring 30 is essentially blocked from rotating in the circumferential direction by the gripping element 34, i.e., by its gripping section 46 engaging the slot 44.

Starting from its end area 60 and proceeding to its free end 64, the arresting element 56 becomes larger in the axial direction; that is, it has a wedge like shape extending in the circumferential direction between the two ends 60, 64, with the result that the smallest axial dimension is present in the area where the gripping section 46 is positioned over the arresting element 56, as shown in FIG. 1, whereas the largest axial dimension is present in the area near the end 64. Through the action of the spring 62, the arresting element 56 is thus pretensioned in the circumferential direction and forced to move until its wedge-like surface 65 strikes the gripping section 46 of the gripping element 34 and can therefore no longer move any farther in the circumferential direction.

The way in which the pressure plate assembly 10 functions in rotational operating mode, especially when wear occurs, is described in the following.

In the new, as yet unworn state of the friction linings normally provided on the clutch disk, the two adjusting rings 28, 30 assume a predetermined relative rotational position when the pressure plate assembly 10 is assembled; in this predetermined position, the axial dimension of the wear-compensating device 26 is also the smallest because of the corresponding relative positioning of the slanted surface areas. In this position, furthermore, the spring 32 is under maximum pretension.

In this state, then, as already described, the adjusting rings 28, 30 are arrested with respect to each other by the pretensioning effect of the gripping element 34 and thus unable to rotate. In the engaged state, furthermore, the stored-energy element 20 is acting on the adjusting ring 30, with the result that the pressure plate 16, which in this situation is resting against the clutch disk, and the resulting opposing force provide another blocking effect on the two adjusting rings 28, 30, which also prevents them from moving. The blocking effect provided by the stored-energy element 20 is much stronger, however, because the stored-energy element 20 exerts a force much greater than the pretensioning force of the gripping element 34.

In this new state of the pressure plate assembly 10, it is also possible for the end section 48 of the gripping section 46 to be a certain axial distance away from the opposing end section 54 of the blocking element 52.

When now the friction linings become worn during operation, e.g., after repeated engagements and disengagements, the pressure plate 16 comes closer and closer to the centrifugal mass arrangement when in the engaged state, which, in the illustration of FIG. 2, corresponds to a movement of the pressure plate 16 in the downward direction relative to the housing 12. As this happens, the end section 48 of the gripping section 46 also moves closer to the blocking element 52. As soon as the amount of wear exceeds a certain value, the gripping section 46 is prevented from moving any farther by the blocking element 52. When additional wear then occurs, therefore, the gripping section 46 will be restrained in the axial direction by the blocking element 52 as the clutch is being engaged and thus lifted away from the adjusting ring 30 as the pressure plate 16 continues to move in the axial direction. A certain amount of axial clearance is thus created between the gripping section 46, which had previously being resting against the adjusting ring 30, and this adjusting ring 30. Because the stored-energy element 20 is still exerting its force on the adjusting rings 28, 30 during the clutch-engaging process and then in the engaged state, as described above, it is still impossible for any relative rotational motion to occur between the two adjusting rings 28, 30, even though the gripping element 34 is no longer exerting any blocking action. In the state in which the further movement of the gripping section 46 is blocked, the gripping section 46 would then in principle be forced to lose contact with the wedge surface 66 of the arresting element 56. But because this arresting element 56 is under the pretension of the spring 62, the arresting element is pulled into the gap which forms as soon as the rising movement of the gripping section 46 begins. The result of this is that, when a clutch-disengaging operation now occurs, in the course of which the end section 48 of the gripping section 46 rises axially again from the blocking element 52, the gripping section 46 is unable to make contact again with the wear-compensating device 26, which is still being prevented by the stored-energy element 20 from making an adjusting movement. Initially, therefore, at the beginning of the disengaging process, the play between the gripping section 46 and the adjusting ring 30 previously produced by wear remains.

During a subsequent clutch-disengaging process, however, the clamping action of the two adjusting rings 28, 30 relative to each other essentially disappears as a result of the elimination or reduction of the actuating force of the stored-energy element 20; whatever clamping force remains is provided at this point almost exclusively by the tangential leaf springs responsible for the return of the pressure plate 16. The axial pretensioning force of these springs, however, is comparatively weak. The adjusting ring 28 is therefore now able to move in the circumferential direction under the action of the helical tension spring 32; the adjusting ring 30 is prevented from moving in the circumferential direction by the gripping element 34. During this relative rotation between the two adjusting rings 28, 30 and the accompanying sliding movement of the various slanted surface areas along each other, the wear-compensating device 26 changes its axial dimension until the adjusting ring 30 comes to rest again against the gripping section 46. The axial dimension of the wear-compensating device 26 has thus been changed essentially to the same extent as that to which the gripping section 46 was previously raised from the adjusting ring 30, this distance corresponding in turn essentially to the extent to which the pressure plate 16 has moved closer, as a result of wear, to the flywheel arrangement in the engaged state. This means ultimately that, when a compensation process such as this has been completed, the wear which has been compensated is essentially the same as that to which the clearance-producing device 36 responded previously. The result is that the axial distance between the friction surface 18 of the pressure plate 16 and the area or point at which the stored-energy element 20 acts on the wear-compensating device 26 has been increased to the same extent that the thickness of the friction lining has decreased. The installation position of the stored-energy element therefore remains unchanged, even after wear has occurred, and thus there will be no change in the engaging or disengaging force characteristic in this type of pressure plate assembly.

Hooking the spring 62 onto the end of the spring 32, which works together with the moving adjusting ring 28, has the result that, even under increasing wear and increasing circumferential movement of the arresting element 56, the spring 62 does not relax to any significant degree. Instead, it is ensured that the spring 62 is put under tension again by the movement of the adjusting ring 28 which occurs as part of the compensation process—the arresting element 56 being held stationary at this time, so that, when more wear occurs, essentially the same amount of pretensioning force is still available to the arresting device for movement in the circumferential direction.

It should be pointed out that, in principle, the design of the pressure plate assembly with wear compensation which has been described above can be modified in a wide variety of ways. For example, it is possible for the wear-compensating device 26 to have only a single adjusting ring, which, when wear occurs and a compensation process is being performed, can move in the circumferential direction around rotational axis A; the slanted surface areas provided on it thus slide along complementary slanted surface areas on the pressure plate. It is also possible to provide several wear-compensating elements which are capable of moving independently of each other and which do not necessarily have to be in the form of rings. Individual wedge elements, which are actuated by associated spring arrangements and which cooperate with separate gripping elements, could also be provided.

It can be seen from the functional description given above of the pressure plate assembly 10 shown in FIGS. 1 and 2 that, whenever the pressure plate moves toward the centrifugal mass arrangement to an extent which exceeds the normal stroke associated with the execution of an engagement or disengagement process (when, for example, as a result of wear, the clutch disk becomes thinner in the area of its friction linings), a blocking interaction between the blocking element 52 and the gripping element 34 is produced, which interaction leads to the actuation of an adjusting movement in the wear-compensating device 26. It is also possible in principle, however, for the pressure plate 16 to move a comparatively long distance in the axial direction relative to the housing 12 when the pressure plate assembly 10 is still in its transport state, before it has been connected to the centrifugal mass arrangement. In this state, there is ultimately no support for the pressure plate 16 which would prevent the excessive axial movement in the direction away from or out of the housing 12. If, in this transport state, the gripping element 34 were to interact with the blocking element 52 and lose contact with the wear-compensating device 26, a corresponding adjusting movement would occur in the wear-compensating device 26, and the pressure plate assembly 10 would ultimately arrive in a state equivalent to that of a friction clutch, i.e., of a clutch disk, which has suffered a comparatively large amount of wear. To prevent this, it is provided in the pressure plate assembly according to the invention that, in the transport state, that is, before the pressure plate assembly 10 has been attached to the centrifugal mass arrangement, the blocking element 52, i.e., its end area 54, is in a state in which it cannot interact with the gripping element 34 to produce a blocking effect. This is described below with reference to FIG. 2.

It can be seen that the blocking element 52 is arranged in such a way that it passes through an opening 70 in the housing arrangement 12. In the design example shown in FIG. 2, this opening 70 is in a transition region between a section 72 of the housing 12 extending essentially in the radial direction and a section 74 of the housing extending essentially in the axial direction. The result of this positioning of the opening 70 is that it expands sharply as it proceeds toward the inside of the housing 12 and that, in addition, the two edge areas or ends 76, 78 on the outside, which are closer together than the edges on the inside and which form the boundaries of the opening 70 on the outside in the radial and axial direction, respectively, are offset radially from each other. The result of this is that, in the state which exists before the threaded bolt 17 is inserted, the blocking element 52 can swivel in the opening 70. In fact, its area 80 inside the housing 12 and also its end area 54 can swivel to such an extent that this area 80 arrives in position extending approximately in the axial direction. This swivelling ultimately means that the blocking element 52, i.e., specifically its end area 54, can travel a considerable distance in the axial direction. During this swivelling movement, the area 82 of the blocking element 52 situated outside the housing 12 loses contact with the section 72 of the housing 12, which extends essentially in the radial direction. To prevent the area 80 of the blocking element 52 inside the housing 12 from escaping outward through the opening 70 in this state, i.e., the state intended for transport in which the blocking element is essentially free to swivel, it is possible, for example, to provide the inner area 80 with a shape or a dimension, such as in the circumferential direction, of such a kind that the area in question cannot pass completely through the opening 70.

With this design, it is also ensured that, before the pressure plate assembly 10 is attached to a centrifugal mass arrangement, i.e., in the state in which, for example, only the tangential leaf springs, etc., which connect the pressure plate to the housing 12, are responsible for the axial movement of the pressure plate 16, contact with the gripping section 46 of the gripping element 34 will carry the blocking element 52 along and swivel it when this axial motion occurs, so that ultimately there can be no blocking interaction between the blocking element 52 and the gripping element 34 which would lift the gripping element 34 from the adjusting ring 30. When the pressure plate assembly 10 is then attached to the centrifugal mass arrangement, the housing 12 and the centrifugal mass arrangement are first brought together and held in the intended relative installation position by some suitable tools or clamping devices; in addition, the clutch disk with its friction linings is also held between the centrifugal mass arrangement and the pressure plate 16. Thus the pressure plate 16 is necessarily brought into a position which corresponds to the engaged position of an unworn friction clutch designed in this way. When, during the assembly process, the pressure plate 16 moves axially toward the housing 12, the blocking element 52 is also swivelled backward by the pressure plate 16 itself, so that it arrives in the intended installation position shown in FIG. 2 for fixation relative to the housing 12. For the subsequent step of bolting the housing 12 to the centrifugal mass arrangement, a fastening bolt 17, namely, the threaded bolt 17 shown in FIG. 2, is inserted through a hole 84 in the area 82 of the blocking element 52 and then screwed into the centrifugal mass arrangement to fix the housing 12 in position on the centrifugal mass arrangement. This threaded bolt 17, therefore, not only fixes the pressure plate assembly 10 in position relative to the centrifugal mass arrangement but also brings the blocking element 52 into its installation position and holds it there relative to the housing 12, in which installation position the blocking element 52 is then able to enter into a blocking interaction with the gripping element 34.

It can therefore be seen that, in the pressure plate assembly according to the invention, as a result of the fact that, in the transport state, the blocking element 52 cannot enter into a blocking interaction with the gripping element 34, there is basically no need for any additional measures positively to prevent any such blocking interaction such as measures which involve the provision of massive transport-securing devices. Nevertheless, to relieve the load on the tangential spring suspension even in the case of a pressure plate assembly according to the invention, it is also possible to provide a transport-securing device which pulls the pressure plate at least slightly back into the housing 12.

It should be pointed out that the section 72 of the housing 12, which extends essentially in the radial direction in the area where the blocking element 52 is provided and through which the threaded bolt 17 passes, can be shifted axially relative to other circumferential areas in the direction toward the end of the housing 12 intended for contact with the centrifugal mass arrangement, namely, to the extent that corresponds essentially to the thickness of the area 82 of the blocking element 52. It is therefore possible to use threaded bolts 17 of the same length in all circumferential areas.

To eliminate or to compensate for the imbalance of the pressure plate assembly 10 or of the housing 12 which may have been introduced by the attachment of the blocking element or by the slight difference in the design of the housing 12 in the corresponding circumferential area, it is possible to provide openings, for example, in other circumferential areas of the housing 12, corresponding to the opening 70; in this case, however, no opening 70 would be provided in the position diametrically across from (relative to the rotational axis A) the opening 70 shown FIG. 2, through which the blocking element 52 passes.

It should be pointed out that, in the case of the pressure plate assembly 10 according to the invention, it can also be provided, for example, that the blocking element 52 is not held in position relative to the housing 12 by a threaded bolt 17 which also fastens the housing 12 to the centrifugal mass arrangement. It can be provided instead that a bolt element, for example, serving only to hold the blocking element 52 in position relative to the housing 12, is inserted through the opening 84 and is then, for example, screwed into a threaded hole provided in the opening 15 of the housing 12 or into a nut element attached to the inside surface of the housing 12. In this case, the blocking state of the blocking element 52 is not obtained simultaneously with or during the fixation of the pressure plate assembly 12 to the flywheel. An additional step is required to achieve this state after the pressure plate assembly 10 has been attached to the flywheel. Because the design variant shown in FIG. 2 makes it possible to reduce the number of parts and to minimize the imbalance introduced by the attachment of the blocking element 52 through the use of the threaded bolt 17 present in any case, this variant is preferred.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure plate assembly for a friction clutch, comprising
    a housing for mounting to a centrifugal mass having an axis of rotation,
    a pressure plate mounted in said housing with freedom to move axially in order to press a clutch disk against the centrifugal mass,
    a stored energy element mounted in said housing and transmitting force along a path to said pressure plate to load said pressure plate toward said centrifugal mass,
    a wear-compensating device in the path of force transmission between the stored energy element and the pressure plate, said wear-compensating device comprising at least one adjusting element which is movable in an adjusting direction to compensate for wear of the clutch disk,
    a blocking element which can be fixed in an installation position relative to said housing,
    a gripping element fixed to said pressure plate, said gripping element blocking said at least one adjusting element against movement in said adjusting direction before wear occurs, said gripping element coming into contact with said blocking element when said blocking element is in said installation position and wear occurs, and
    means for bringing said blocking element into said installation position in response to said housing being mounted to said centrifugal mass.

2. A pressure plate assembly as in claim 1 wherein said means for bringing said blocking element into said installation position comprises a fastening bolt which attaches the housing to the centrifugal mass.

3. A pressure plate assembly as in claim 2 wherein, when said housing is firmly attached to said centrifugal mass by said fastening bolt, said blocking element is fixed to said housing in said installation position.

4. A pressure plate assembly as in claim 1 wherein said housing comprises an opening through which said blocking element passes, said opening allowing relative motion between the housing and the blocking element, said blocking element having an area inside said housing which comes into contact with said gripping element, and an area outside said housing where said blocking element is attached to said housing.

5. A pressure plate assembly as in claim 4 further comprising a fastening bolt which fastens said blocking element to said housing and fastens said housing to said centrifugal mass.

6. A pressure plate assembly as in claim 4 wherein said area of said blocking element inside said housing has a shape which prevents said area inside said housing from passing through said opening.

7. A pressure plate assembly as in claim 4 wherein said blocking element has an area inside said housing which comes into contact with said gripping element, said area inside said housing being free to move axially before said blocking element is fixed to said housing in said installation position.

8. A friction clutch comprising a pressure plate assembly, said pressure plate assembly comprising

- a housing for mounting to a centrifugal mass having an axis of rotation,
- a pressure plate mounted in said housing with freedom to move axially in order to press a clutch disk against the centrifugal mass,
- a stored energy element mounted in said housing and transmitting force along a path to said pressure plate to load said pressure plate toward said flywheel,
- a wear-compensating device in the path of force transmission between the stored energy element and the pressure plate, said wear-compensating device comprising at least one adjusting element which is movable in an adjusting direction to compensate for wear of the clutch disk,
- a blocking element which can be fixed in position relative to said housing,
- a gripping element fixed to said pressure plate, said gripping element blocking said at least one adjusting element against movement in said adjusting direction before wear occurs, said gripping element coming into contact with said blocking element when said blocking element is in said installation position and wear occurs, and
- means for bringing said blocking element into said installation position in response to said housing being mounted to said centrifugal mass.

* * * * *